United States Patent Office 3,702,264
Patented Nov. 7, 1972

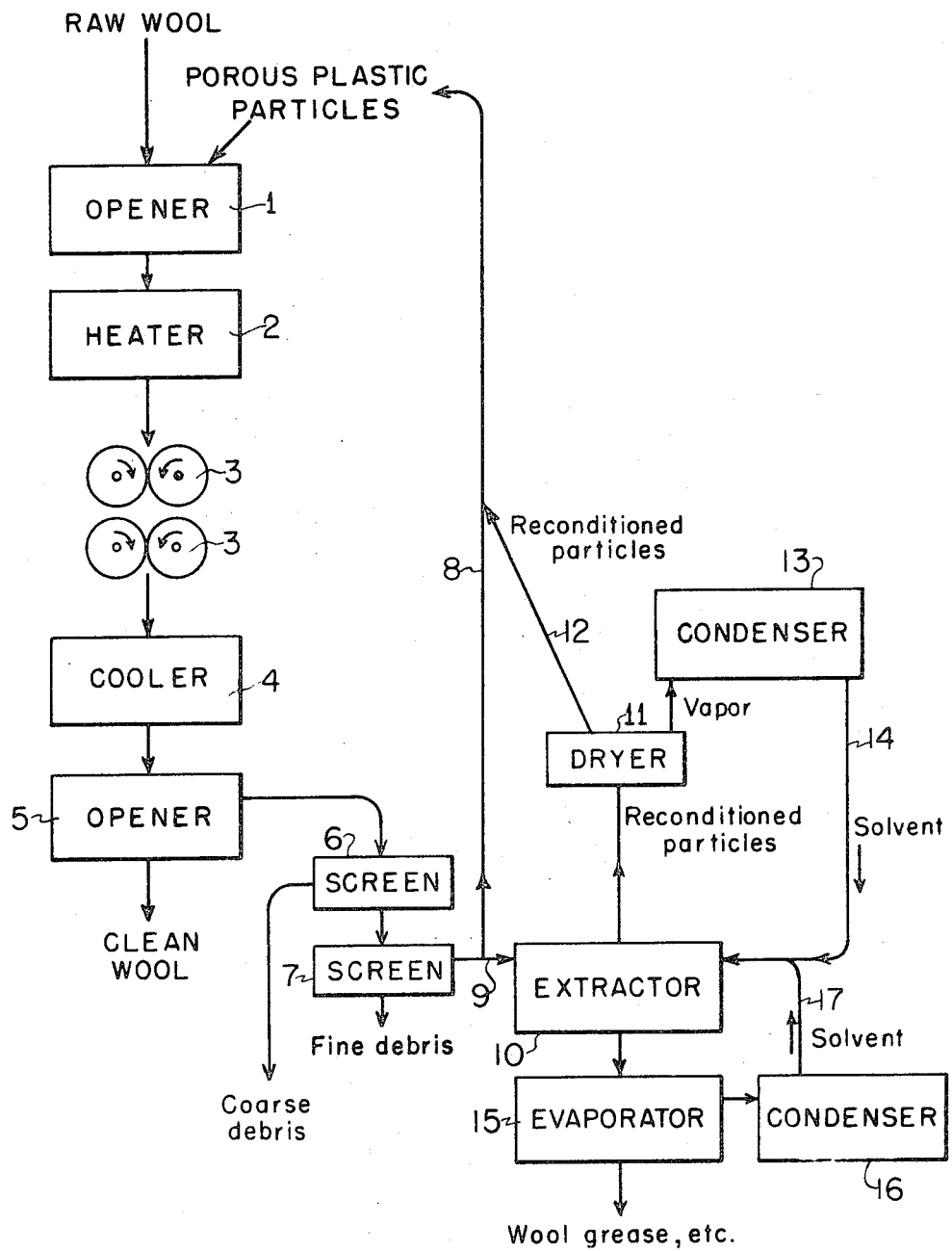

3,702,264
PROCESS FOR CLEANING WOOL
George H. Robertson, Albany, Calif., assignor to the United States of America as represented by the Secretary of Agriculture
Filed Apr. 12, 1971, Ser. No. 132,948
Int. Cl. D06g 1/00; D06l 1/00
U.S. Cl. 134—7                    12 Claims

ABSTRACT OF THE DISCLOSURE

Grease, suint, and other impurities are removed from raw wool by a novel procedure. Example: Raw wool is opened, commingled with particles of a plastic foam, heated, pressed, and the resulting clean wool separated from the plastic particles containing absorbed impurities.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for cleaning wool. Further objects of the invention will be evident from the following description wherein parts and percentages are by weight unless otherwise specified. Percentages of impurities reported herein are based on the weight of clean, dry wool.

The single figure in the annexed drawing is a flow sheet illustrating procedures in accordance with the invention.

Raw wool entering the textile mill is loaded with impurities so that it requires cleaning before it can be converted into yarns or other manufactured products. The impurities present in raw wool can be placed in two broad categories: (1) The natural impurities secreted by the animal and (2) the acquired impurities. The natural impurities consist of two major components (a) suint, being the dried water-soluble material secreted by the sweat glands of the animal and consisting mostly of potassium salts of fatty acids, and (b) wool grease, a complex water-insoluble mixture of fats and oils secreted by the sebaceous glands of the animal. The acquired impurities, often termed dirt, include fecal matter, sand and other earthy material, and vegetable matter such as bits of grass and other plants, burrs, etc. The nature and quantity of the impurities in raw wool vary, depending to a certain extent upon the breed of the animal and the geographical, climatic, and nutritional conditions under which it is raised. A typical raw wool will contain about 6–12% grease, 20–30% suint, and 10–20% dirt. The grease in the raw wool is generally considered to be the chief offender in that it is not only an impurity per se, but also it acts by its adhesive nature to entrap and hold to the fibers the other impurities such as the suint, dirt, etc. The usual method for cleaning raw wool—generally termed scouring—involves an aqueous procedure wherein the raw wool is propelled by mechanical action through a series of bowls containing soap (or synthetic detergent) plus soda ash dissolved in warm water. In transferring the wool from one bowl to the next in line, the wool is passed through squeeze rolls to press out the dirty scouring liquor. In a final bowl, water alone is used to obtain a rinsing effect. After passing through a final set of squeeze rolls, the wool is dried and then is ready for the next step—usually, carding.

Athough the usual aqueous scouring technique is widely used in this country, as well as abroad, it presents certain problems. Foremost among these is the matter of disposal of the spent scouring liquor. This liquor is a foul-smelling material, the disposal of which is a continuing problem in the industry. Because of its high content of grease and other organic compounds, the waste, if discharged into a stream or other water course, causes destruction of marine life and pollution of the stream. Another disadvantage of aqueous scouring procedures is that the mechanical working of the fibers in the warm washing medium causes a matting and entanglement of the individual fibers, with the end result that when the scoured and dried product is carded, so much force is required to pull apart the matted fibers that an excessive proportion of noils (short, low-value fibers) are formed. Another item is that wool is very sensitive to and easily damaged by contact with alkaline reagents. Since the usual wool-scouring treatment is carried out in a liquor made strongly alkaline with soda ash (sodium carbonate), a certain degree of damage to the wool is an inevitable result of the procedure.

A primary object of the present invention is to provide the means for obviating the problems outlined above. A particular feature of the invention is the elimination of the conventional aqueous treatment. Instead, a procedure is employed which permits removal of impurities in a dry manner. As a consequence, the process of the invention does not yield an aqueous waste material. Rather, the waste consists of solid and semi-solid fractions, both of which can be disposed of readily, for example, by burning. Moreover, if it is desired to utilize the waste for recovery of wool grease or other components, this can be done more readily than with aqueous wastes because the waste resulting from the invention is in a concentrated form and free from water. Another important facet of the invention is that it does not lead to matting or entanglement of the fibers so that breakage of fibers and production of noils is minimized. A further important advantage of the invention is that it eliminates contacting the wool with any alkaline material whereby the intrinsic properties of the wool are preserved.

Basically, the process of the invention involves cleaning raw wool by treatment with porous plastic particles, more specifically, particles of polystyrene foam. For use in the invention, commercially-available resilient polystyrene foam (also referred to as expanded or cellular polystyrene) is ground into particulate form.

The particle size selected has an important bearing on the operation of the process of the invention. Where the particles are too fine, they will lodge in the scales of the wool fibers and hence be carried along with the final product (the clean wool). Another disadvantage of too fine a particle size is that reconditioning of the particles will be hampered in that screening will be ineffective to separate the particles from fine silt derived from the raw wool. On the other hand, if the particles are too coarse they will be less efficient in cleaning because the particles will not properly penetrate into the fibrous mass that constitues the raw wool. Taking these considerations into account, it has been found that the particles should have a mesh size of about 45 to 100, preferably about 45 to 80.

It is recognized that prior hereto it has been suggested that raw wool may be cleaned by application of particulate material, namely, mineral products such as gypsum (McBride, U.S. Pat. 1,218,573) or vegetative products such as ground wheat, rice, barley, or other starchy material (Boer, U.S. Pat. 2,982,676). The plastic particles used in accordance with the invention provide substantial benefits over the prior art materials. A serious disadvantage of mineral substances such as gypsum is that they have abrasive qualities. When mineral particles are worked into the mass of raw wool, damage is caused by abrading the surfaces of the fibers, for example, by removing some of the scales which normally make up the outer wall of the fibers. As a result, the products do not provide normal results in subsequent operations, for example, they take up dyes unevenly. Moreover, any portion of the mineral material which is retained by the product—for example, lodged in the scale structure of the fibers—is very deleterious to processing equipment, causing rapid wear of fiber-contacting parts of the machinery such as card wires, combs, guides, drafting rolls, etc. On the other hand, the particles of the invention being plastic materials are not abrasive and do not cause the untoward results outlined above. Another item is that both mineral and starchy substances are friable; when they are worked into the raw wool the individual particles tend to crumble and form a fine dust. This dust tends to lodge in the scale structure of the fibers so that it interferes with subsequent processing of the cleaned wool, causing problems in dyeing, unusual wear of fiber-contacting equipment, and formation of dust during operations such as combing and carding, etc. The plastic particles of the invention are not friable. They are resilient so that they respond to pressures by yielding (deforming) rather than rupturing, and return to their original shape when the pressures are relieved. Thus, mechanical working does not reduce the plastic particles to a dust. This is important not only to produce a good product, but also it means that the plastic products can be used over and over again. Another advantage of the plastic particles of the invention is that because of their yieldable nature they can be pressed into very intimate, form-fitting contact with the curved surfaces of the individual fibers, thereby attaining a very effective absorption of impurities from the fiber surfaces. Such contact cannot possibly be achieved with mineral or starchy materials because of their non-yieldable character. Starchy particles also suffer from the disadvantage that they are perishable—they are subject to attack by molds, yeasts and other microorganisms. Also, they will attract rodents, insects, and other pests. The plastic products of the invention are not nutritive, hence are neither subject to spoilage nor attractive to insects or rodents.

The practice of the invention is next described in detail, having reference to the annexed drawing.

Block 1 represents an opener—a conventional device used in textile mills to loosen and open up compressed or entangled masses of fibers. Although an opener is preferred, one can alternatively employ any textile-treating equipment which exerts combing or carding action.

The raw wool to be cleaned is fed into opener 1 along with the particles of porous plastic material. By the action of the opener, the raw wool is loosened and fibers separated and the plastic particles are coated on the surfaces of the individual fibers.

Although it is preferred to apply the porous particles as the raw wool is being opened, an alternative procedure is to first open the raw wool and then dust the porous particles onto the opened mass and apply mechanical action such as tumbling or the like to commingle the particles with the wool fibers. This two-step procedure has the advantage that during the opening step a certain preliminary degree of cleansing takes place—some of the impurities which are loosely bound tend to fall out of the raw wool as it is opened.

In any event, an excess of the porous particles is used to ensure the presence of enough to absorb essentially all the grease, suint, etc. in the raw wool. Accordingly, one employs at least 2 parts, preferably about 5 to 10 parts, of the porous particles per part of raw wool.

The grease existing on the surfaces of the raw wool fibers is normally in a solid, waxy condition, and it is necessary to liquefy it so that it can be absorbed by the porous particles. To this end the raw wool now coated with the porous particles is directed to a heater represented by block 2. This heater can be of any conventional type such as an oven or a chamber through which hot air is recirculated. In any event, the raw wool-porous particle mass should be brought to a temperature of about 150 to 200° F.

Following the heating step, the mass is pressed by passing it through rollers 3, which are preferably heated (internally) to a temperature of about 150–200° F. to maintain the wool grease in a liquefied condition. This compression step has the desirable effect of forcing the porous particles into intimate contact with the fiber surfaces. Since the particles are composed of plastic material, they are capable of bending without rupturing so that they can be deformed (by the applied pressure) to intimately fit the rounded contours of the fibers. This intimate contact ensures thorough absorption of grease, suint, etc. from the fiber surfaces by the particles.

Usually, rollers 3 are so adjusted that the mass is compressed at about 50 to 100 p.s.i., preferably about 70 to 80 p.s.i. For best results, the mass is repeatedly passed through the rollers, for example, about 10–30 times.

In the figure, two pairs of rollers 3 are shown merely by way of illustration. It is obvious that one could provide a single pair of rollers or a stand of many pairs of rollers.

Hereinabove it has been explained that the mass (the raw wool plus porous particles) is heated and pressed in separate stages. This system is generally preferred, but an alternative procedure is to omit the separate heating step and utilize the passage between hot rolls to effect both heating and pressing of the mass.

Following passage through rollers 3, the mass, in block 4, is cooled to ambient (room) temperature. No specialized equipment is needed for this operation; the mass may simply be allowed to remain in the open, or it may be contacted with a current of cool air, etc.

Block 5 represents an opener or other equipment of the same kind as described in connection with block 1. The mass from cooling step 4 is directed into opener 5 where the wool (now in a clean state) is collected and constitutes the desired product of the operation.

Since essentially all the grease has been absorbed by the porous particles, there is no longer any medium on the fibers to adhere various other impurities such as vegetable matter, sand, etc. Consequently, when the opening step of block 5 is applied, all of the impurities—even those not absorbed by the particles—fall away from the wool. Thus the opening step yields the clean wool plus a material—herein termed "detritus"—composed of the porous plastic particles, bits of vegetative matter, silt, etc. In order to recover the porous particles for re-use, the detritus is first subjected to screening.

In typical operations, the detritus is first applied to screen 6 which is of coarse mesh so that it will pass the porous particles, fine silt, etc. but retain the larger-sized material such as burrs, bits of vegetable material, larger particles of dirt, etc. The material which passes through screen 6 is then directed to a finer screen 7 which retains the porous particles but passes the fine silt, etc.

The porous particles retained on screen 7 can be directed back to opener 1 for re-use in treating additional amounts of raw wool. It may be noted in this connection, that the particles can be re-used over and over again (without reconditioning) up to the point where they have cleaned twice their weight of wool.

In a preferred plan of operation, the stream of porous particles from screen 7 is split into two parts; one part is recycled (via line 8) to opener 1; the other part is directed by line 9 to equipment for reconditioning, i.e., to remove absorbed impurities.

To recondition the porous particles, they are conveyed to extractor 10 wherein they are extracted with an alcohol such as methanol, ethanol, propanol, or isopropanol. This solvent dissolves the grease and other absorbed material out of the particles, leaving them in prime condition for re-use. After passing the reconditioned particles through dryer 11, to remove any remaining alcohol solvent, they are conveyed via lines 12 and 8 to opener 1. Solvent vapor emanating from dryer 11 may be condensed in condenser 13 and directed to extractor 10 via line 14.

The extract produced in extractor 10 is directed to evaporator 15 wherein the alcoholic solvent is evaporated. The vapors are directed to condenser 16 and the alcohol solvent then recycled to extractor 10 via line 17.

The residue from the evaporation of the alcohol solvent is a dark-colored semi-solid mass consisting mostly of wool grease and suint. Since this material is in a highly concentrated form, being essentially free from water or other diluent, it can be disposed of readily, or alternatively, economically processed for the recovery of lanolin and potassium values. Alternatively, the material can be burned, providing an ash rich in potassium (derived from the suint), hence useful in compounding fertilizers.

Hereinabove it has been explained that the detritus from the final opening step (block 5) is subjected to screening operations to segregate the porous particles from wool impurities. Alternative techniques can be used. For example, one may apply separation systems which rely on density differences such as air classification. Alternatively, screening may be used in conjunction with air classification.

EXAMPLE

The invention is further demonsrtated by the following illustrative example.

A quantity of raw wool was opened and dusted with particles of polystyrene foam ("Styrofoam"), having a mesh size ranging from 45 to 80, using about 9 parts of the particles per part of raw wool. After the raw wool and particles had been intimately blended together, the mass was heated in an oven to 180° F. and passed (20 times) through a pair of heated (about 180° F.) rollers adjusted to exert a pressure of about 70–80 pounds per sq. in.

The pressed mass was allowed to cool to room temperature, then passed through an opener where the wool (now clean) was separated from the polystyrene particles, impurities, etc.

Analysis of the raw wool and the clean wool product gave the following results:

|  | Grease | Suint | Dirt |
|---|---|---|---|
| Raw wool, percent | 6 | 24 | 10 |
| Cleaned wool, percent | 0.5 | 4.5 | 0 |

I claim:
1. A process for cleaning raw wool which comprises
   (a) applying particles of a foamed plastic to raw wool,
   (b) intimately commingling said particles and raw wool, and
   (c) separating the wool from the loosened impurities and the added particles of foamed plastic.
2. The process of claim 1 wherein the said particles have a mesh size in the range from about 45 to about 100.
3. The process of claim 1 wherein the said particles are applied in a proportion of at least 2 parts thereof per part of raw wool.
4. The process of claim 1 wherein the said particles are particles of polystyrene foam.
5. The process of claim 1 wherein the raw wool is opened to disentangle and separate the fibers, prior to application of the said particles.
6. The process of claim 1 wherein the raw wool is opened to disentangle and separate the fibers, concomitantly with application of the said particles.
7. The process of claim 1 wherein the raw wool with the applied particles is heated to a temperature of about 150 to 200° F.
8. The process of claim 1 wherein the raw wool with the applied particles is repeatedly compressed while at a temperature of about 150 to 200° F.
9. The process of claim 8 wherein the compression is at about 50 to 100 p.s.i.
10. A process for cleaning raw wool which comprises
    (a) opening the raw wool to disentangle and separate the fibers,
    (b) applying to the opened raw wool particles of plastic foam, said particles having a mesh size from about 45 to about 100,
    (c) heating the resulting mass to a temperature of about 150 to about 200° F., and repeatedly pressing it to force the particles into intimate contact with the fiber surfaces,
    (d) cooling the so-treated mass to ambient temperature, and
    (e) opening the cooled mass to separate the cleaned wool from the loosened impurities and the added particles.
11. A process for cleaning raw wool, which comprises
    (a) opening the raw wool to disentangle and separate the fibers,
    (b) applying to the opened raw wool particles of resilient polystyrene foam in a proportion of at least 2 parts thereof per part of raw wool, the particles having a mesh size in the range from about 45 to 100,
    (c) heating the resulting mass to a temperature of about 150 to 200° F., and repeatedly presing it in the range from about 50 to 100 p.s.i. to force the polystyrene foam particles into intimate contact with the fiber surfaces,
    (d) cooling the so-treated mass to ambient temperature, and
    (e) opening the cooled mass to disentangle the fibers and separate the cleaned wool from the loosened impurities and the polystyrene foam particles containing absorbed grease and other substances derived from the raw wool.
12. The process of claim 11 wherein the polystyrene foam particles separated in Step (e) are reconditioned by extracting them with a water-soluble alcohol, and the reconditioned particles are recycled for treating additional portions of raw wool.

References Cited

UNITED STATES PATENTS

| 293,902 | 2/1884 | Miller | 134—7 X |
| 1,218,573 | 3/1917 | McBride | 134—7 X |
| 1,473,431 | 11/1923 | Holstein | 8—142 UX |
| 2,161,504 | 6/1939 | Campbell | 134—7 X |
| 2,895,857 | 7/1969 | Boer | 134—7 |
| 2,982,676 | 5/1961 | Boer | 134—7 |
| 3,512,823 | 5/1970 | Dixon et al. | 8—137 X |
| 3,647,354 | 3/1972 | Loeb | 8—137 X |

MORRIS O. WOLK, Primary Examiner

D. G. MILLMAN, Assistant Examiner

U.S. Cl. X.R.

8—139; 134—10